US012490676B2

(12) United States Patent
Shane et al.

(10) Patent No.: US 12,490,676 B2
(45) Date of Patent: Dec. 9, 2025

(54) LOCKING MECHANISM FOR THE SUSPENSION ASSEMBLY OF A HARVESTER AND AGRICULTURAL HARVESTER

(71) Applicant: CNH Industrial America LLC, New Holland, PA (US)

(72) Inventors: Nicholas S. Shane, Rock Island, IL (US); Daniel Christopher Dallman, Eldridge, IA (US); Giuliano da Costa Maestro, Piracicaba (BR); Daenio Cleodolphi, Piracicaba (BR); Marco Aurélio Ramos Pereira, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 496 days.

(21) Appl. No.: 18/086,234

(22) Filed: Dec. 21, 2022

(65) Prior Publication Data

US 2023/0200302 A1    Jun. 29, 2023

Related U.S. Application Data

(60) Provisional application No. 63/293,121, filed on Dec. 23, 2021.

(51) Int. Cl.
  *A01D 75/18* (2006.01)
  *A01D 45/10* (2006.01)
(52) U.S. Cl.
  CPC ............. *A01D 75/18* (2013.01); *A01D 45/10* (2013.01)

(58) Field of Classification Search
  CPC ...... A01D 75/18; A01D 45/10; A01D 45/003; A01D 75/00; A01D 67/00; A01D 67/005; F15B 15/261
  See application file for complete search history.

(56) References Cited

U.S. PATENT DOCUMENTS

| 389,023 | A | * | 9/1888 | Spaulding | A01D 75/18 |
| | | | | | 56/284 |
| 3,599,404 | A | * | 8/1971 | Fernandez | A01D 45/10 |
| | | | | | 56/98 |
| 4,529,215 | A | * | 7/1985 | Strand | A01B 63/22 |
| | | | | | 280/43.23 |
| 2018/0213723 | A1 | * | 8/2018 | Ubaldi | F16F 9/00 |
| 2019/0335657 | A1 | * | 11/2019 | Gonzalez | B60D 1/465 |

* cited by examiner

*Primary Examiner* — Brad Harcourt
(74) *Attorney, Agent, or Firm* — Dority & Manning, P.A.

(57) ABSTRACT

A locking mechanism for a suspension assembly of a harvester, particularly those intended for the harvest of tall and stem plants, such as sugarcane and sweet sorghum, being designed to ensure that the harvester remains raised during maintenance procedures and thus avoids the risk of accidents and damage to the harvester. The locking mechanism includes a lock pivotably mounted to the chassis through a pivoting connection at a pivot end of the lock and disposed adjacent to the actuator cylinder. The lock has an opening configured to at least partially surround a fixed portion of the actuator cylinder and has a circumferential diameter smaller than a diameter of a movable portion of the actuator cylinder. The locking mechanism further includes a locking element disposed at an opposite end of the lock. The locking element is configured to interact with retaining bearings mounted on the chassis.

14 Claims, 3 Drawing Sheets

LOCKING MECHANISM FOR THE SUSPENSION ASSEMBLY OF A HARVESTER AND AGRICULTURAL HARVESTER

FIELD OF INVENTION

The present invention refers, in general, to a new proposal for a locking mechanism for the suspension assembly of an agricultural harvester, such as sugarcane and/or sweet sorghum harvesting machines. More particularly, this locking mechanism is formed by technical, constructive and functional features designed and developed to lock the harvester suspension assembly in order to improve operating conditions and increase safety levels during maintenance procedures.

In addition, the invention refers to a harvester, particularly those designed for the harvest of tall and stemmed plants, such as sugarcane and/or sorghum, which incorporates the suspension assembly locking mechanism.

BACKGROUND OF THE INVENTION

According to the prior art, and as the general knowledge of the person skilled in the art must be, numerous models of agricultural machinery and equipment are known to promote increased productivity in the harvest of various types of vegetable crops, such as harvesting machines grain in general, forage plant machines and machines for harvesting tall and stemmed plants, such as sugarcane harvesters.

More particularly, regarding to machines for harvesting tall and stemmed plants, such as sugarcane, as is the case of cane and sweet sorghum, these machines are designed and developed to promote the harvest of this specific type of culture, this because its intrinsic features require specific conditions for its safe and adequate processing, from cutting to transfer to transshipments and trucks.

In this context, it is known that these harvesting machines for tall and stemmed plants comprise a front portion where various equipment and devices responsible for cutting and removing plants from the ground are installed, such as, for example, row dividers, topper, knockdown rollers, cutting discs, among other mechanisms that help in the work of cutting and harvesting tall and stem plants.

As must be appreciated by the person skilled in the art, mainly these frontal elements, they are the ones that suffer the most from wear, as they end up having the initial and most aggressive contact with the crop. For this reason, they end up requiring periodic and frequent maintenance to replace components, whether due to wear or breakage during the harvesting process.

Thus, to perform these maintenance procedures, the harvesters comprise a suspension assembly, usually arranged on the front to adjust the height of the equipment and devices responsible for cutting the plants, which is extended as far as possible to raise the harvester machine and allow the operator or maintenance technician access to those components that need to be repaired. However, to safely perform maintenance procedures, the harvester must be prevented from lowering while the operator performs maintenance under the harvester.

The solutions known in the prior art to prevent the harvester from lowering present practicality problems, but mainly safety, while aiming the difficulty of positioning, for example, the wedges at certain points of the harvester, in addition to the weight and dimensions of these mechanisms to keep the machine raised, which motivates improper handling and positioning by operators and technicians, putting the operator himself at risk, but also the integrity of the harvesters.

Also, it is possible to find solutions in prior art that are intended to prevent the movement of the suspension cylinder assembly of the said harvester, however, these solutions comprise locks applied vertically and reveal more complex constructions that continue to interfere and hindering the handling of operators and technicians to ensure that the machines are locked in the raised position for maintenance.

Thus, as it possible to observe, harvesters, such as sugarcane harvesters, known in the prior art, lack a practical, functional, but mainly efficient and safe solution, in order to ensure the physical integrity of the machines, and mainly operators/technicians during maintenance procedures.

Thus, it is verified that the proposals known in the prior art to prevent the harvester from lowering during maintenance procedures are not practical, efficient and safe, and may cause serious accidents to operators and maintenance technicians and also damage to harvester. Therefore, these are, among others, the inconveniences and limitations that are intended to be solved with the development of the present invention.

DESCRIPTION OF THE INVENTION

Thus, according to the above, the present invention aims to provide a new locking mechanism for the suspension assembly of a harvester, particularly those intended for the harvest of sugarcane and sweet sorghum, being that this new locking mechanism was designed and developed to obtain a practical, functional and efficient solution to the problems, limitations and inconveniences revealed in the prior art, as summarized above.

More particularly, it is one of the objectives of the present invention provide a new locking mechanism for the suspension assembly of a harvester, which comprises technical, constructive and functional features capable of providing an optimized and simplified way to ensure that the harvester remains raised during the performance maintenance procedures and thus avoiding accidents and damage to the harvester.

Also, it is an object of the present invention provides a harvester, such as those intended for the harvest of sugar cane and sweet sorghum, which comprises a new locking mechanism for the suspension assembly, as mentioned above.

Thus, in order to achieve the technical and functional improvements summarized above, among others, the present invention refers to a new locking mechanism for the suspension assembly of a harvester, essentially formed by at least one assembly of suspension that has an actuator cylinder formed by a fixed portion mounted on the chassis of the harvester, and a mobile portion configured for lifting the harvester, and said locking mechanism comprises a lock pivotally mounted on the chassis through a pivoting connection and disposed adjacent to said actuator cylinder. Furthermore, said lock has an opening configured to involve, at least in part, the fixed portion of the actuator cylinder and has a circumferential diameter smaller than the diameter of the movable portion of said actuator cylinder. Furthermore, said locking mechanism comprises a locking element disposed at the opposite end to said pivotal connection and it is configured to interact with retaining bearings mounted on said chassis of the harvester machine.

According to a particular embodiment of the locking mechanism of the present invention, said retaining bearings mounted on the machine chassis are configured for locking the lock in the open and closed positions, respectively.

Still, according to another embodiment of the present invention, the locking mechanism comprises a safety return element configured to drive said lock towards the retaining bearing. Optionally, this safety return element is a spring installed in the pivoting connection itself or next to said retaining bearing.

According to another possible embodiment of the present invention, said lock of the locking mechanism comprises a stop disposed on the lower face and, more particularly, on the peripheral edge of said opening of the lock.

According to a particular embodiment of the present invention, said pivoting connection of the locking mechanism is formed by a pivot bearing fixed to the chassis and a clamping pin that passes through holes arranged in the pivoting bearing and at the pivoting end of the lock.

Additionally, according to another embodiment of the present invention, said locking element can comprise at least one locking bearing pierced by a pin, which can comprise a spring.

The present invention also relates to an agricultural harvester which comprises at least one suspension assembly formed by an actuator cylinder, and such harvester further comprises at least one locking mechanism as discussed above which is configured to interact with said suspension actuator cylinder. Particularly, the agricultural harvester, according to the present invention, is intended for harvesting sugarcane and/or sweet sorghum.

BRIEF DESCRIPTION OF DRAWINGS

The features, advantages and technical effects of the present invention, as highlighted above, will be better understood from the following detailed description, given by way of example, and non-restrictive, of particular embodiments, and with reference to the accompanying schematic figures, in which.

DESCRIPTION OF EMBODIMENTS OF THE INVENTION

The invention will now be described with respect to its particular embodiments with reference to the attached figures. Such figures are schematic, and their dimensions and/or proportions may not correspond to reality, as they aim to describe the invention in a didactic way. Furthermore, certain known and common constructive details may have been omitted for greater clarity and conciseness from the description that follows. Reference numbers used are repeated throughout the figures to identify identical or similar parts. The terms eventually used such as "above", "below", "front", "back", "right", "left" etc., and its variants should be interpreted according to the guidance given in FIG. 1.

The terms used herein such as harvester, harvesting machine and their variants are used indistinctly to indicate an agricultural machine intended for the harvest of a vegetable crop and, in the case of this description, for the harvest of tall and stemmed plants, such as sugarcane, energy cane, sorghum, etc.

Figure 1:
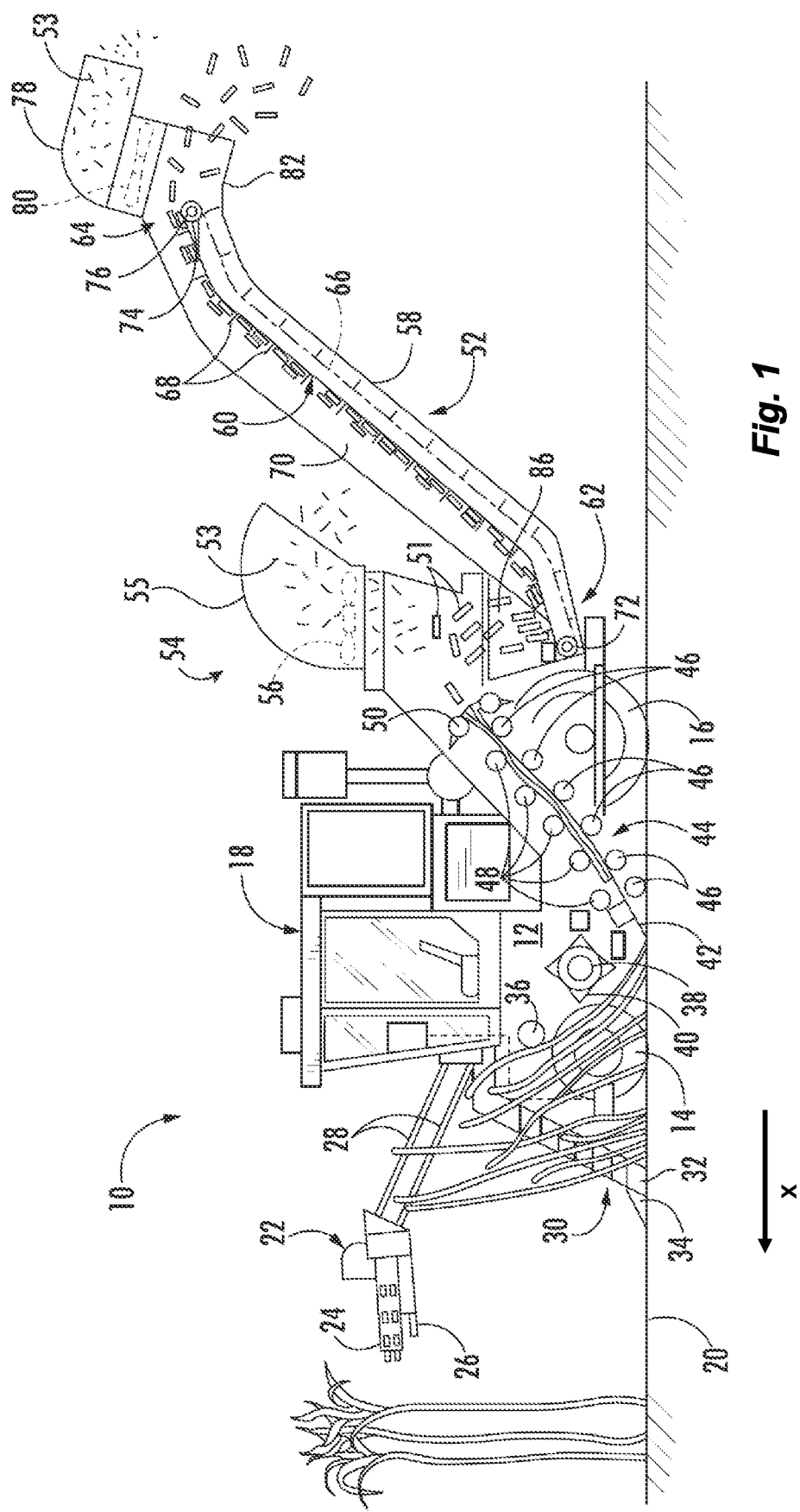
FIG. 1 is a schematic side view of a harvesting machine for harvesting tall, stemmed vegetable crops such as sugar cane and sorghum.

Refer to the drawings, FIG. 1 illustrates a side view of an embodiment of an agricultural harvester 10 according to aspects known in the prior art. As shown, harvester 10 is configured as a sugarcane harvester. However, in other embodiments, the harvester 10 can correspond to any suitable agricultural harvester known in the prior art.

Still referring to FIG. 1, harvester 10 includes a chassis 12, a pair of front wheels 14, a pair of rear wheels 16, and an operator cabin 18. Harvester 10 may also include a primary source of power (e.g., an engine mounted on chassis 12) that powers one or both pairs of wheels 14, 16 via a transmission (not shown). Alternatively, the harvester 10 may be a conveyor driven harvester and therefore may include conveyor driven by the motor mechanism in place of the illustrated wheels 14, 16. The motor mechanism can also drive a hydraulic fluid pump (not shown) configured to generate pressurized hydraulic fluid to drive various hydraulic components of the harvester 10, including the wheels or conveyor.

Additionally, the harvester 10 can include various components for cutting, processing, cleaning and discharging sugarcane as the cane is harvested from an agricultural field 20. For example, harvester 10 may include a topper assembly 22 positioned at its front end to intercept the sugar cane as harvester 10 moves in the forward direction, as indicated by the "x" arrow in FIG. 1. As shown, the topper assembly 22 may include either a gathering disc 24 or a cutting disc 26. The gathering disc 24 may be configured to gather sugar cane stalks so that cutting disc 26 can be used to cut the tip of each stalk. Generally, the height of the topper assembly 22 can be adjustable via a pair of arms 28 hydraulically raised and lowered as desired by the operator.

Additionally, harvester 10 may include a row divider assembly 30 that extends upwardly and rearwardly from field 20. generally, the row divider 30 may include two spiral feed rollers 32, also known as a "lollipop". Each feed roller 32 may include a soil footing 34 as its bottom end assists the row divider 30 separating the sugarcane stalks for harvesting. In addition, as shown in FIG. 1, harvester 10 may include a knockdown roller 36 positioned proximate the front wheels 14 and a roller with projections 38 positioned behind the knockdown roller 36. As the knockdown roller 36 is rotated, the harvested sugar cane stalks are tumbled while the row divider 30 binds the stalks from the agricultural field 20 towards the interior of the machine 10. Additionally, as shown in FIG. 1, the projection roller 38 may include a plurality of intermittently mounted fins 40 which assist in forcing the sugar cane stalks downwardly. As roller 38 is rotated during harvesting, the sugarcane stalks that have been tumbled by knockdown roller 36 are separated and subsequently tumbled by roller 38 as harvester 10 continues to be moved forward direction relative to the field 20.

Still referring to FIG. 1, harvester 10 may also include a base cutter assembly 42 positioned behind the roller 38. As is generally understood, the base cutting assembly 42 may include blades (not shown) for cutting the sugar cane stalks as the cane is harvested. The blades, located on the periphery of the assembly may be rotated by a hydraulic motor (not shown) driven by the vehicle's hydraulic system. Additionally, in several embodiments, the blades can be angled downward to cut the base of the sugar cane as the cane is tumbled by the roller 38.

In addition, the harvester 10 may include an assembly of one or more feed rollers 44 located downstream of the base cut assembly 42 for moving the cut sugar cane stalks from the base cut assembly 42 along the processing trajectory. As shown in FIG. 1, the feed roller assembly 44 can include a plurality of bottom rollers 46 and a plurality of top rollers 48. As the sugar cane is conveyed through the assembly of feed rollers 44, debris (e.g. stones, dirt and/or the like) may also be conveyed or fall through the bottom rollers 46 onto the field 20.

Additionally, harvester 10 may include a chopper assembly 50 located at the downstream end of the feed roller assembly 44 (e.g., adjacent to the rearmost bottom and top feed rollers 46, 48). In general, the chopper assembly 50 can be used to cut or chop harvested sugarcane stalks into smaller pieces or "billets" 51 which may, for example, measure 15.24 centimeters (six (6) inches), also called stem or grinding wheels. The billets 51 can then be propelled towards an elevator assembly 52 of the harvester 10 to be collected in an external receiver or storage device (not shown) such as an transshipment or truck conveyor.

As is generally understood, pieces of debris 53 (e.g. dust, dirt, leaves, etc.) separated from the sugar cane billets 51 can be expelled from the harvester 10 through a primary extractor assembly 54, which is located behind of the chopper assembly 50 and is oriented to direct the debris and refuse 53 out of the harvester 10. Additionally, a fan 56 may be mounted on the primary extractor 54 for generating a suction force or vacuum sufficient to capture the debris/spoilage 53 and force that debris 53 through the primary extractors 54. The debris and spoilage 53 are then directed outward and generally away from the harvester 10 via a primary extractor outlet 54. The separated billets 51 and heavier than the debris 53 being expelled from the extractor 54 can then fall to the elevator assembly 52.

According to this specification, the elevator assembly 52 is to be understood as comprising, in general, an elevator housing structure 58 and an elevator 60 extending within said elevator housing structure 58 between a lower proximal end 62 and an upper distal end 64. The lower proximal end 62 being secured to the machine 10 and the upper distal end 64 having an opening 82 for discharging the collected material.

In additional or alternative embodiments, elevator 60 may include a chain or conveyor belt 66 and a plurality of paddles or slats 68 coupled or evenly spaced on the chain 66. The slats 68 can be configured to hold the sugar cane billets 51 in the elevator 60 as the billets 51 are lifted to the upper portion 70 of the elevator 60. Additionally, elevator 60 may include lower and upper sprockets 72, 74 positioned around proximal and distal ends 62, 64, respectively. As shown in FIG. 1, an elevator motor 76 can be coupled to one of the sprockets (e.g., the upper sprocket 74) for driving the chain 66, thereby allowing the chain 66 and slats 68 to travel on a cycle without end between the proximal and distal ends 62, 64 of the elevator 60.

In addition, pieces of debris and refuse 53 (e.g. dust, dirt, leaves, etc.) separated from the sugar cane billets 51 can be expelled from the harvester 10 through a secondary extractor assembly 78 coupled to the rear end of the elevator housing structure 58. As shown in FIG. 1, the secondary extractor assembly 78 can be located adjacent to the distal end 64 of the elevator 60 and can be oriented to direct the debris and refuse 53 away from the harvester 10. Additionally, a fan 80 can be mounted on the secondary extractor assembly 78 for generating a suction force or vacuum sufficient to extract the debris 53 and force such debris 53 and refuse 53 through the secondary extractor 78. Separated billets 51, heavier than debris 53 expelled through the extractor 78, may then fall from distal end 64 of elevator 60. Typically, the billets 51 may fall through a discharge opening 82 of the elevator assembly 52 into an external storage device (not shown), such as a cart, an transshipment, a bucket, etc.

During operation, the harvester 10 travels through the entire agricultural field 20 to harvest sugarcane or any other tall and stemmed plants. After the height of the topper assembly 22 is adjusted (if used) by means of the arms 28, the gathering disc 24 in the topper assembly 22 can function to gather the sugarcane ends as per the harvester 10 advances through field 20, while cutter disc 26 cuts the hardwood ends of the sugarcane stalks to dump them along both sides of the harvester 10. As the stalks enter the row divider 30, the shoes 34 can set the operating width to determine the quantity of sugarcane entering the throat of the harvester 10, either fixedly or adjustable. The lollipops 32 then clump together the stalks at the inlet of the machine to allow the knockdown roller 36 to bend the stalks downward in conjunction with the action of the roller 38. Since the stems are positioned at an angle as shown in FIG. 1, the base cutter assembly 42 can then cut the base of the stems from field 20. The cut stems are then directed to the set of feed rollers 44.

Cut sugar cane stalks are transported backwards by feed rollers 46, 48 which compress the stalks and harvested material. At the downstream end of the feed roller assembly 44, the chopper assembly 50 cuts or chops the compacted sugar cane stalks into pieces or billets 51. Debris and transported refuse 53 (e.g. dust, dirt, leaves, etc.) separated from the sugar cane billets 51 are then extracted through the primary extractor assembly 54 using the suction created by the fan 56. The separated/cleaned billets 51 then fall into the elevator assembly 52 and travel upward via elevator 60 from its proximal end 62 to the distal end 64. During normal operation, once the billets 51 reach the distal end 64 of the elevator 60, the billets 51 fall through the discharge opening 82 to an external storage device. Similar to primary extractor assembly 54, debris are blown out of harvester 10 through secondary extractor assembly 78 with the aid of fan 80.

A harvester machine 10 as described above may be, for example, a machine known in the prior art, such as the cane harvester of CNH Industrial N.V. commercialized under the brand Case IH.

Additionally, as should be appreciated by those skilled in the art, these models of harvester machine 10 comprise a suspension assembly 90 designed to be used in adjusting the height of the front portion of the machine 10 in relation to the ground 20, with this suspension assembly 90 fixed to the chassis 12 and it is formed by at least one actuator cylinder 91 which has a fixed portion 92 anchored to the chassis 12 of the machine 10, and a movable portion 93 responsible for raising the machine 10 to thereby allow the operator or maintenance technician access the mechanisms that must be repaired in the lower portion of the harvester 10.

Figure 2A:
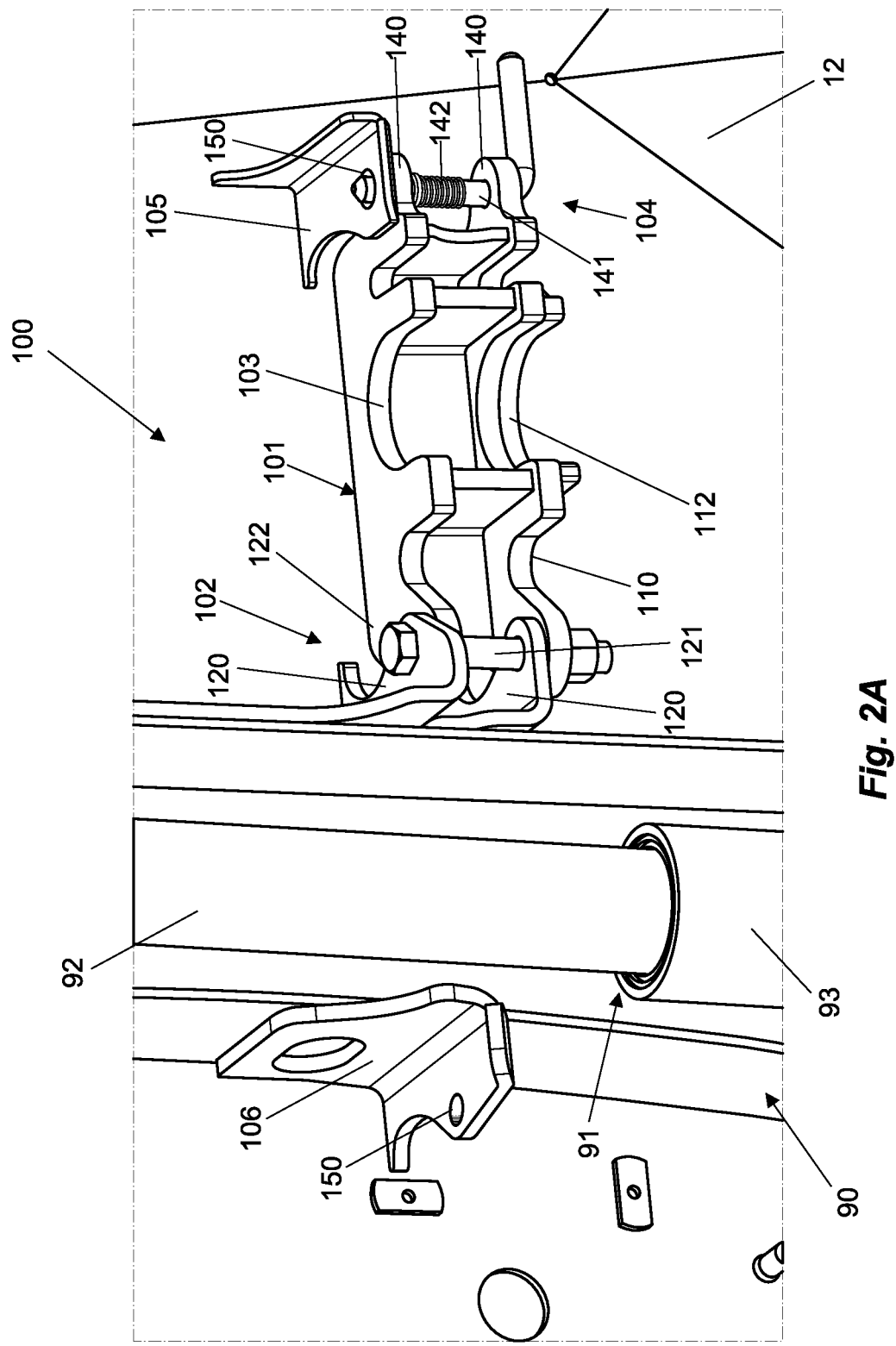
FIGS. 2A and 2B are schematic perspective views of the new locking mechanism for the suspension assembly, according to an embodiment of the present invention, in the open position and in the closed position, respectively.
Figure 2B:
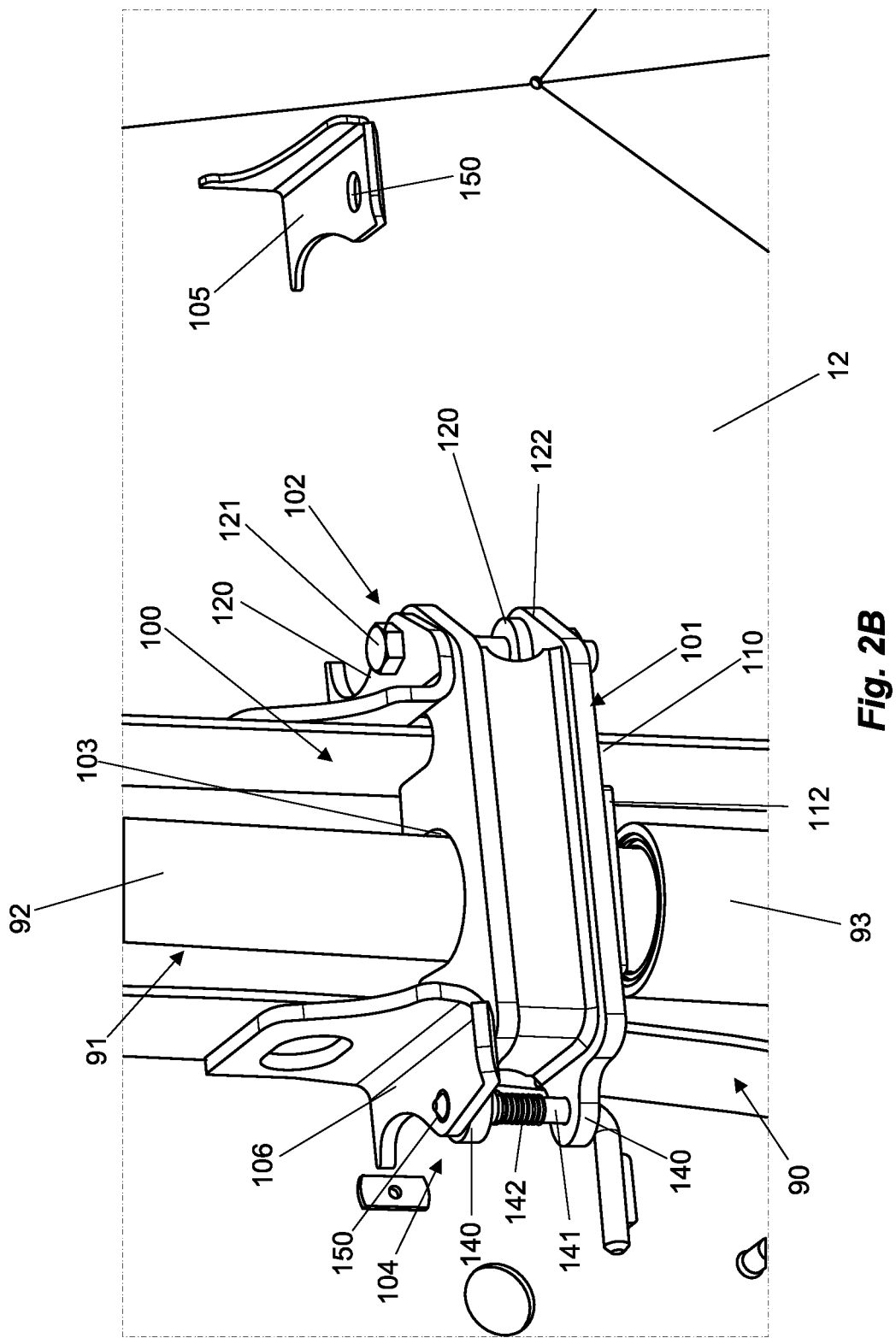

In this context, based on the above, and with reference now to FIGS. 2A and 2B, it can be stated that the present invention refers to a locking mechanism 100 for the suspension assembly 90, which is essentially formed by a lock 101 assembled pivoting on the chassis 12 of the harvester 10 through a pivoting connection 102 and disposed adjacent to the actuator cylinder 91, said lock 101 further comprises an opening 103 configured to at least partially surround the fixed portion 92 and have a circumferential diameter smaller than the diameter of the movable portion 93 of the actuator cylinder 91. The locking mechanism 100 further comprises a locking element 104 disposed at the end opposite to the pivoting connection 102 and is configured to interact with retaining bearings 105, 106 mounted on the chassis 12 and configured to block said lock 101 in open and closed positions, respectively.

Thus, as can be seen, when the actuator cylinder 91 is extended to raise the harvester 10, its movable portion 93 is moved downwards, at this time, the operator or maintenance technician can disengage the locking element 104 from the retaining bearing 105, and moving the lock 101 to the closed position, engaging the locking element 104 with the retaining bearing 106. Thus, if there is any failure in the actuator cylinder 91, the lock 101 prevents the mobile portion 93 from moving and, consequently, the harvester 10 remains upright, without any risk of accidents if the operator or maintenance technician is still under the harvester 10 or cause possible damage to harvester components if it suddenly lowers.

According to an embodiment of the present invention, the locking mechanism 100 may additionally comprise a safety return element, the purpose of which is to push the lock 101 towards the open position, that is, towards the retaining bearing 105. Thus, if the operator or service technician does not properly engage the locking element 104 in the retaining bearing 106, the lock 101 will return to the open position, providing a visual indication to the operator that the locking element 104 needs to be correctly engaged. Also, at the end of the maintenance procedure, if the operator or technician does not correctly engage the locking element 104 in the retaining bearing 105, this return element is able to keep the lock 101 in the open position and, thus, avoid possible collisions between the lock 101 and the movable portion 93 of the actuator cylinder 91 and, consequently, possible damage to the components of the harvester 10 are also avoided.

According to a particular embodiment of the present invention, this safety return element can be a spring, which can be installed in the pivoting connection 102 itself, or possibly close to the retaining bearing 106.

According to another particular embodiment of the present invention, the lock 101 may further comprise a stop 112 disposed on the lower face 110 and, more particularly, this stop 112 is formed on the peripheral edge of said opening 103 of the lock 101, and it is configured to the purpose of assist and absorb the contact between the lock 101 and the movable portion 93.

According to another embodiment of the locking mechanism 100, according to the present invention, the pivoting connection 102 can be formed by a pivot bearing 120 fixed to the chassis 12 of the harvester 10 and a fastening pin 121 that passes through holes arranged in the pivot bearing 120 and at the pivot end 122 of the lock 101.

According to another embodiment of the present invention, the locking element 104 can be formed by bearings 140, which are pierced by a pin 141, wherein said pin can further comprise a spring 142 to drive the pin 141 in order to always keep it in the blocking condition to, thus, interact with the retaining bearings 105, 106 which are provided with hole 150 for receiving said pin 141 and, in this way, lock the lock 101 in the open position or in the closed position, respectively.

Thus, considering all of the above, it should be clear that the new proposal of the locking mechanism 100 for the suspension set 90 of the harvester 10, according to the present invention, manages to prevent the suspension set 90 from lowering during the maintenance procedures where it is required that the harvester 10 remains raised and, therefore, ensure the safety of the operator or maintenance technician during the performance of the tasks and also ensure the integrity of the harvester 10.

Additionally, as mentioned above, the present invention also refers to an agricultural harvester 10, such as those intended for harvesting tall and stemmed plants, said harvester 10 comprising at least one suspension assembly 90 whose actuator cylinder 91 is configured to be locked through a locking mechanism 100, in accordance with the features described and defined above. According to particular embodiments of the present invention, this agricultural harvester 10 can be a cane or sorghum harvesting machine.

Finally, in view of all the above, it is worth noting that the present description is intended only to present and define, as an example, particular embodiments of the locking mechanism 100 for the suspension assembly of a harvester 10, according to the present invention. Therefore, as a person skilled in the art should appreciate, several modifications and combinations of elements and equivalent details are possible without, therefore, deviating from the scope of protection defined by the attached claims.

The invention claimed is:

1. An agricultural harvester comprising:
    a chassis;
    retaining bearings mounted on the chassis;
    a moveable portion;
    at least one suspension assembly comprising an actuator cylinder comprising a fixed portion mounted on the chassis of the harvester, and the moveable portion configured for raising the chassis; and
    a locking mechanism comprising:
        a lock pivotably mounted to the chassis through a pivoting connection at a pivot end of the lock, the pivoting connection disposed adjacent to the actuator cylinder, the lock comprising an opening configured to at least partially surround the fixed portion of the actuator cylinder, the opening having a diameter smaller than a diameter of the movable portion of the actuator cylinder; and
        a locking element disposed at an opposite end of the lock, the locking element comprising a pin, the pin extending through the lock, the locking element configured to directly interact with the retaining bearings mounted on the chassis.

2. The agricultural harvester according to claim 1, wherein the retaining bearings mounted on the chassis are configured to retain the lock in open and closed positions.

3. The agricultural harvester according to claim 1, further comprising a safety return element configured to drive the lock towards one of the retaining bearings.

4. The agricultural harvester according to claim 3, wherein the safety return element is a spring disposed at the pivoting connection or next to one of the retaining bearings.

5. The agricultural harvester according to claim 1, wherein the lock further comprises a stop disposed on a peripheral edge of the opening of the lock.

6. The agricultural harvester according to claim 1, wherein the pivoting connection comprises a pivot bearing fixed to the chassis and a fastening pin that passes through holes arranged in the pivot bearing and in the lock at the pivot end of the lock.

7. The agricultural harvester according to claim 1, wherein the locking element further comprises a spring.

8. The agricultural harvester according to claim 1, wherein the harvester is configured for harvesting sugarcane or sweet sorghum.

9. An agricultural harvester comprising:
    a chassis;

retaining bearings mounted on the chassis;

a moveable portion;

at least one suspension assembly comprising an actuator cylinder comprising a fixed portion mounted on the chassis of the harvester, and the moveable portion configured for raising the chassis;

a locking mechanism comprising:
- a lock pivotably mounted to the chassis through a pivoting connection at a pivot end of the lock, the pivoting connection disposed adjacent to the actuator cylinder, the lock comprising an opening configured to at least partially surround the fixed portion of the actuator cylinder, the opening having a diameter smaller than a diameter of the movable portion of the actuator cylinder; and
- a locking element disposed at an opposite end of the lock, the locking element configured to interact with the retaining bearings mounted on the chassis; and a safety return element configured to drive the lock towards one of the retaining bearings, wherein the safety return element is a spring disposed at the pivoting connection or next to one of the retaining bearings.

10. The agricultural harvester according to claim 9, wherein the retaining bearings mounted on the chassis are configured to retain the lock in open and closed positions.

11. The agricultural harvester according to claim 9, wherein the lock further comprises a stop disposed on a peripheral edge of the opening of the lock.

12. The agricultural harvester according to claim 9, wherein the pivoting connection comprises a pivot bearing fixed to the chassis and a fastening pin that passes through holes arranged in the pivot bearing and in the lock at the pivot end of the lock.

13. The agricultural harvester according to claim 9, wherein the locking element further comprises a spring.

14. The agricultural harvester according to claim 9, wherein the harvester is configured for harvesting sugarcane or sweet sorghum.

* * * * *